US008973350B2

(12) United States Patent
Haseyama et al.

(10) Patent No.: US 8,973,350 B2
(45) Date of Patent: Mar. 10, 2015

(54) CONTROL METHOD OF EXHAUST GAS PURIFICATION SYSTEM AND EXHAUST GAS PURIFICATION SYSTEM (75) Inventors: Takashi Haseyama, Fujisawa (JP); Shinji Gotou, Fujisawa (JP); Kenji Hagio, Fujisawa (JP); Tatsuo Mashiko, Fujisawa (JP); Yoshinobu Watanabe, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 933 days.

(21) Appl. No.: 12/227,930

(22) PCT Filed: May 14, 2007

(86) PCT No.: PCT/JP2007/059890
§ 371 (c)(1),
(2), (4) Date: Dec. 3, 2008

(87) PCT Pub. No.: WO2007/145046
PCT Pub. Date: Dec. 21, 2007

(65) Prior Publication Data
US 2009/0165446 A1    Jul. 2, 2009

(30) Foreign Application Priority Data

Jun. 13, 2006    (JP) .................................. 2006-163052

(51) Int. Cl.
*F01N 3/00*    (2006.01)
*F01N 3/02*    (2006.01)
(Continued)

(52) U.S. Cl.
CPC .. *F01N 3/02* (2013.01); *F01N 3/20* (2013.01); *F02D 41/027* (2013.01);
(Continued)

(58) Field of Classification Search
CPC .. F02D 41/027; F02D 41/2416; F02D 41/402
USPC ............................ 60/274, 285, 295, 286, 311
See application file for complete search history.

(56) References Cited

U.S. PATENT DOCUMENTS 5,189,876 A * 3/1993 Hirota et al. .................... 60/286
5,623,824 A   4/1997 Yukawa et al.
(Continued)

FOREIGN PATENT DOCUMENTS

JP    57-171035 A    10/1982
JP    57171035 A *   10/1982
(Continued)

OTHER PUBLICATIONS

English Translation of JP57171035A to Yukinobu Nishimura et al.*
(Continued)

*Primary Examiner* — Kenneth Bomberg
*Assistant Examiner* — Anthony Ayala Delgado
(74) *Attorney, Agent, or Firm* — Staas & Halsey LLP (57) ABSTRACT In forced regeneration control of an exhaust gas purification device 12, data for control such as the number of meshes of a data map and the number of data maps for forced regeneration control is reduced and occurrence of torque shock is avoided by smoothly changing a fuel pressure. In the forced regeneration control of the exhaust gas purification device, when an operation state of an internal combustion engine is in a high-load operation state, normal injection control by stopping multi injection is carried out and according to a rotation speed and a load of the internal combustion engine, a region for control is divided into a multi-injection control region, a transition region, and a normal injection control region, and in the transition region, data for fuel pressure control obtained by interpolation of data for fuel pressure control on the multi-injection control region side and data for fuel pressure control on the normal injection control region side is used.

6 Claims, 5 Drawing Sheets (51) Int. Cl.
*F01N 3/20* (2006.01)
*F02D 41/02* (2006.01)
*F02D 41/24* (2006.01)
*F02D 41/40* (2006.01)

(52) U.S. Cl.
CPC ......... *F02D 41/2416* (2013.01); *F02D 41/402* (2013.01); *F02D 2250/21* (2013.01); *F02D 2250/31* (2013.01); *Y02T 10/44* (2013.01); *Y02T 10/20* (2013.01)
USPC .................. 60/295; 60/285; 60/297; 60/272

(56) References Cited

U.S. PATENT DOCUMENTS

| | | | |
|---|---|---|---|
| 6,032,637 | A | 3/2000 | Mamiya et al. |
| 6,272,424 | B1 * | 8/2001 | Yoshida et al. ............... 701/103 |
| 6,966,179 | B2 * | 11/2005 | Onodera et al. ................ 60/295 |
| 7,115,237 | B2 * | 10/2006 | Sato et al. ................... 423/213.2 |
| 2003/0106531 | A1 * | 6/2003 | Saeki et al. .................... 123/435 |
| 2003/0233997 | A1 * | 12/2003 | Kawaguchi et al. .......... 123/299 |
| 2004/0105801 | A1 | 6/2004 | Sato et al. |
| 2004/0112335 | A1 | 6/2004 | Makino et al. |
| 2004/0181331 | A1 * | 9/2004 | Nagaishi et al. .............. 701/104 |
| 2005/0065691 | A1 | 3/2005 | Cho |
| 2005/0217245 | A1 * | 10/2005 | Haseyama et al. ............... 60/278 |
| 2005/0247052 | A1 * | 11/2005 | Kobayashi et al. ............. 60/297 |
| 2005/0252198 | A1 | 11/2005 | Okugawa et al. |
| 2006/0201144 | A1 | 9/2006 | Gabe et al. |
| 2007/0214778 | A1 | 9/2007 | Narita et al. |

FOREIGN PATENT DOCUMENTS

| | | |
|---|---|---|
| JP | 59-12138 A | 1/1984 |
| JP | 61-46435 | 3/1986 |
| JP | 2-85845 | 7/1990 |
| JP | 06-93915 | 4/1994 |
| JP | 10-176562 | 6/1998 |
| JP | 10-196441 A | 7/1998 |
| JP | 11-219350 A | 8/1999 |
| JP | 11-351029 A | 12/1999 |
| JP | 2000-38944 | 2/2000 |
| JP | 2003-201899 | 7/2003 |
| JP | 2003-227393 | 8/2003 |
| JP | 2004-108320 | 4/2004 |
| JP | 2004-162612 | 6/2004 |
| JP | 2004301007 A | 10/2004 |
| JP | 2004-353529 | 12/2004 |
| JP | 2004-360577 | 12/2004 |
| JP | 2005-083373 | 3/2005 |
| JP | 2005-351264 | 12/2005 |
| JP | 2006-125370 | 5/2006 |
| JP | 2006-132458 | 5/2006 |
| WO | WO 2005/116410 A1 | 12/2005 |
| WO | WO 2007/145044 A1 | 12/2007 |

OTHER PUBLICATIONS

Abstract of Japanese Publication No. 2004-108320, Published Apr. 8, 2004.
Abstract of Japanese Publication No. 2006-125370, Published May 18, 2006.
Abstract of Japanese Publication No. 2003-227393, Published Aug. 15, 2003.
Abstract of Japanese Publication No. 6-93915, Published Apr. 5, 1994.
Abstract of Japanese Publication No. 61-46435, Published Mar. 6, 1986.
Abstract of Japanese Publication No. 2004-353529, Published Dec. 16, 2004.
Patent Abstracts of Japan, Publication No. 2004-301007, Published Oct. 28, 2004.
Patent Abstracts of Japan, Publication No. 11-219350, Published Aug. 10, 1999.
Patent Abstracts of Japan, Publication No. 57-171035, Published Oct. 21, 1982.
Patent Abstracts of Japan, Publication No. 10-196441, Published Jul. 28, 1998.
Patent Abstracts of Japan, Publication No. 11-351029, Published Dec. 21, 1999.
International Search Report for PCT/JP2007/059867, mailed Aug. 21, 2007.
Sep. 29, 2011 Office Action in co-pending U.S. Appl. No. 12/227,901.
Oct. 20, 2011 Office Action (Interview Summary) in co-pending U.S. Appl. No. 12/227,901.
Final Office Action mailed Apr. 25, 2012 in U.S. Appl. No. 12/227,901.
Patent Abstracts of Japan, Publication No. 2004-162612, Published Jun. 10, 2004.
Patent Abstracts of Japan, Publication No. 2003-201899, Published Jul. 18, 2003.

* cited by examiner

CONTROL METHOD OF EXHAUST GAS PURIFICATION SYSTEM AND EXHAUST GAS PURIFICATION SYSTEM

CROSS REFERENCE TO RELATED PATENT APPLICATIONS

This application claims the benefit under 35 U.S.C. Section 371, of International Application No. PCT/JP2007/059890, filed May 14, 2007, which claimed priority to Japanese Application No. 2006-163052, filed Jun. 13, 2006, in the Japanese Patent Office, the disclosures of all of which are hereby incorporated by reference.

BACKGROUND OF THE INVENTION

The present invention relates to a control method of exhaust gas purification system and an exhaust gas purification system that can simplify data for fuel pressure control and prevent occurrence of a torque shock at forced regeneration control accompanying multi injection of an exhaust gas purification device such as a continuous regeneration type DPF device or an NOx purification device.

DESCRIPTION OF THE RELATED ART

Regulations on emissions of the particulate matter (PM: particulate matter: Hereinafter referred to as PM) as well as NOx, CO, HC and the like exhausted from a diesel engine have been tightened year by year. A technology has been developed that the PM is trapped by a filter called a diesel particulate filter (DPF: Diesel Particulate Filter: Hereinafter referred to as DPF) so as to reduce the PM amount exhausted to the outside. A continuous regeneration type DPF device carrying a catalyst is among them.

This continuous regeneration type DPF device includes an exhaust gas purification device with an oxidation catalyst device carrying an oxidation catalyst and a DPF device arranged in order from the upstream side or an exhaust gas purification device with a DPF device carrying an oxidation catalyst arranged and the like. In this device, when a temperature of an exhaust gas flowing into a filter is approximately 350° C. Or above, the PM trapped by the filter is continuously burned and purifed, and the filter is selff-regenerated. However, if the exhaust gas temperature is low, the temperature of a catlalyst is lowered and not actived. Thus, the oxidation reaction is not promoted, and oxidation of the PM and self-regeneration of the filter become difficult. As a result, accumulation of PM on the filter continues and clogging of the filter progresses, which results in a problem of exhaust pressure rise due to the clogging of the filter. above, the PM trapped by the filter is continuously burned and purified, and the filter is self-regenerated. However, if the exhaust gas temperature is low, the temperature of a catalyst is lowered and not activated. Thus, the oxidation reaction is not promoted, and oxidation of the PM and self-regeneration of the filter become difficult. As a result, accumulation of PM on the filter continues and clogging of the filter progresses, which results in a problem of exhaust pressure rise due to the clogging of the filter.

Thus, if the clogging of the filter exceeds a predetermined amount, HC (hydrocarbon) supplied into the exhaust gas by post injection (post-injection) in a cylinder (in-cylinder) and the like is burned by the oxidation catalyst arranged on the upstream side of the filter or the oxidation catalyst carried by the filter. Using this combustion heat, the temperature of the exhaust gas at the filter inlet or the filter surface is raised, the temperature of the filter is raised above a temperature at which the PM accumulated at the filter is burned, and the PM is burned and removed.

At this time, if the oxidation catalyst is below an activation temperature, HC is not oxidized but exhausted as white smoke. Thus, in this case, after the exhaust gas temperature is raised by performing in-cylinder multi-injection (multi-stage delayed injection) so that the oxidation catalyst temperature is raised at the activation temperature and above, the post injection is carried out. Using the exhaust gas temperature rise by this multi injection, the DPF inlet temperature can be raised while preventing exhaust of the white smoke.

In this multi injection of the forced regeneration control, a target fuel pressure (common rail pressure) is set lower than that at normal injection control in normal operation, not the forced regeneration operation, so as to lower an injection pressure, to slow combustion and to increase post-burning period so that the exhaust temperature is raised. As an example, as described in Japanese Patent Application Kokai Publication No. 2004-162612, there is known an exhaust purification device of an internal combustion engine in which the injection pressure of an injector is reduced so that the exhaust temperature is raised in the forced regeneration operation.

In relation to the above, obtaining a finding that the exhaust gas temperature exhausted from an exhaust manifold is raised when an engine is in a high-load operation state, the inventors have reached the following idea. In the forced regeneration control, when the engine is in the high-load operation state, the exhaust gas temperature is raised in a normal operation without performing the multi injection, and the multi injection does not have to be performed. Therefore, in this high-load operation state in the forced regeneration control, it is only necessary that the normal injection control at the normal operation is carried out. Thereby, a portion of the high-load operation state in the data map of the data for injection control of the forced regeneration control can be substituted by the data for injection control of the normal injection control for normal operation. As a result, the data for injection control in the high-load operation state is not needed any more, and reduction of the data for control can be promoted.

That is, by means of control of stopping the multi injection and switching to the normal injection when the high-load operation state is brought about during the forced regeneration control or the state is changed to the high-load operation in the middle of the forced regeneration control, the multi injection control in the high-load operation state can be eliminated. Therefore, controllability such as reduction in the number of meshes of the control map can be improved, for example. Even if the exhaust gas temperature exhausted from the exhaust manifold is raised to some degree, since it might take time till the filter inlet temperature at the downstream side of the oxidation catalyst is raised, there is a case in which the exhaust gas temperature rise control should be continued even in the high-load operation state.

On the other hand, even in the high-load operation state of the forced regeneration operation, injection with the same fuel pressure as the normal injection control at the normal operation is preferable in order to ensure low-pollution exhaust gas, and it is desirable that a fuel pressure to be a control target is set high similar to the normal injection control. Then, in the high-load operation state, when the multi injection is switched to the normal injection, the fuel pressure may be switched from the fuel pressure at the multi injection to the fuel pressure at the normal injection.

However, since the forced regeneration control might be executed during travelling or stopping work, the engine operation state during the forced regeneration control is not always constant. In the exhaust gas temperature rise control, there are a case of low-/medium-load operation states requiring the multi injection, a case of the high-load operation state not requiring the multi injection or a case of transition between these states and the like. If the fuel pressure of the multi injection is switched to the fuel pressure of the normal injection or vice versa at such transition, there is a problem that a torque shock occurs. That is, a torque generation amount is different since the fuel pressure of the multi injection and the fuel pressure of the normal injection are different in size and moreover, since the state is a high-load operation, a large fluctuation occurs in the generated torque of the engine at the switching.

On the other hand, as a general measure against the torque shock, as described in Japanese Patent Application Kokai Publication No. 2003-201899, for example, a compression ignition type internal combustion engine is proposed in which a predetermined moderating control is executed for a change amount with a target value of a fuel injection amount at the switching of a fuel injection mode between a low heat rate pilot/main injection mode (first injection mode) and a normal injection mode (second injection mode) other than that. The generally practiced moderating control is a control for gradually changing a control target amount such as the present injection amount, injection timing and the like to a new control target amount over time. Thus, if the moderating control takes time, that causes a problem of follow-up performance in control, while if the time for the moderating control is reduced, a torque-shock prevention effect is reduced, which is also a problem. Also, that is not associated with quantitative simplification of data for control for determining control target values.

Patent Document 1: Japanese Patent Application Kokai Publication No. 2004-162612 (paragraphs [0025], [0035])

Patent Document 2: Japanese Patent Application Kokai Publication No. 2003-201899 (claim 3, column 16)

SUMMARY OF THE INVENTION

The present invention was made in order to solve the above problems and has an object to provide, in forced regeneration control of an exhaust gas purification device such as a continuous regeneration type DPF device, NOx purification device and the like, a control method of exhaust gas purification system and an exhaust gas purification system that can reduce data for control such as the number of meshes of a data map, the number of data maps and the like in the forced regeneration control and avoid occurrence of a torque shock by smoothly performing change in the fuel pressure.

Means For Solving The Problems

The exhaust gas purification method for achieving the above object is, in a control method of an exhaust gas purification system including an exhaust gas purification device having an oxidation catalyst device carrying an oxidation catalyst on the upstream side or an exhaust gas purification device carrying an oxidation catalyst and a controller for carrying out forced regeneration control for recovering purification capability of the exhaust gas purification device in an exhaust passage of an internal combustion engine, in which at forced regeneration control, the controller executes the multi injection control in order to raise an exhaust temperature, wherein, at the forced regeneration control, if an operation state of the internal combustion engine is a high-load operation state, normal injection control is executed by stopping the multi injection, a region for control is divided into a multi-injection control region, a transition region, and a normal-injection control region according to a rotation speed and a load of the internal combustion engine, and in the transition region, in-cylinder fuel injection is carried out using data for fuel pressure control obtained by interpolation of data for fuel pressure control of the multi injection control on the multi-injection control region side and data for fuel pressure control of the normal injection control on the normal injection control region side.

Moreover, in the above control method of exhaust gas purification system, the interpolation in the transition region is performed such that based on a load $Q_m$ at a rotation speed $Ne_m$ of the internal combustion engine, supposing that a load and data for fuel pressure control at a boundary on the multi-injection control region side at the rotation speed $Ne_m$ are $Q_{ml}$ and $P_{ml}$, and that a load and data for fuel pressure control at a boundary on the normal injection control region side at the rotation speed $Ne_m$ are $Q_{nl}$ and $P_{nl}$, the data $P_t$ for fuel pressure control calculated by $P_t = ((Q_{nl} - Q_t) \cdot P_{ml} + (Q_t - Q_{ml}) \cdot P_{nl}) / (Q_{nl} - Q_{ml})$ is set as the data P for fuel pressure control in the transition region.

Also, in the above control method of exhaust gas purification system, a total fuel injection amount injected during 1 cycle of each cylinder is used instead of the load.

The high-load operation state refers to an operation state of an internal combustion engine in which a load is relatively large and an exhaust temperature, which is a temperature of an exhaust gas exhausted from a cylinder, is higher than a predetermined temperature. On the control, the high-load operation state can be considered as an operation state in which a load, which is an engine output required for an internal combustion engine, is above a predetermined load determined according to a rotation speed of the internal combustion engine. This predetermined load can be set in advance by experiments, calculation and the like and inputted and stored in the controller.

And if a state is the high-load operation state or not can be determined by referring to a data map based on the engine rotation speed and the load of the internal combustion engine. Instead of the load, an output from an accelerator sensor, a fuel injection amount necessary to exert a required engine output, a total fuel injection amount injected into a cylinder and the like may be used. These injection amounts are an amount injected during 1 cycle of each cylinder.

The fuel pressure is a pressure when a fuel is injected into a cylinder and includes pressure such as an injection pressure, a common rail pressure closely related to this pressure and the like. This fuel pressure is 80 to 180 MPa at normal injection, for example, and is lower at multi injection than at the normal injection. It is different according to the rotation speed. A drop amount of the fuel pressure might reach approximately several tens % of the fuel pressure at the normal injection depending on a case.

According to the above control method, in the high-load operation state, since the exhaust gas temperature exhausted from the exhaust manifold of the internal combustion engine is raised, there is no need to carry out the multi injection for raising the exhaust gas temperature in order to raise or maintain a temperature of a catalyst or a DPF. In view of the above, at the forced regeneration control, if an operation state of an internal combustion engine is brought into a high-load operation state, control to stop the multi-injection control and to change to the normal injection control is executed. As a result, in a data map of data for control of the forced regeneration control, a portion of the high-load operation state can be substituted by data for control of a data map and the like of normal operation (operation state not in the forced regeneration control) in which the normal injection control is carried out. Thus, the portion of the high-load operation state of the data map and the like of the data for control of the forced regeneration control is not needed any more. Therefore, the number of meshes of the data map for the forced regeneration control and the like can be reduced, and the number of data maps and the like for environmental correction and the like can be also reduced. The data maps for environmental correction relate to atmospheric temperature, atmospheric pressure, engine water temperature, operating states of other auxiliary machines and the like.

Also, in the above control method, a transition region is provided between a multi-injection control region in which the multi-injection (multi-stage injection) control for raising an exhaust gas temperature is carried out when the exhaust gas temperature is low according to a load of the internal combustion engine and a normal injection control region corresponding to the high-load operation state not requiring temperature rise by the multi-injection control. During the forced regeneration control, when the operation state of the internal combustion engine is changed from the multi-injection control region to the transition region due to increase of a load of the internal combustion engine, weighting is applied according to a position in the transition region and data for fuel pressure control in the transition region is acquired by interpolating the data for fuel pressure control in the both regions.

In this transition region, by carrying out in-cylinder fuel injection using the data for fuel pressure control obtained by interpolation, the in-cylinder fuel injection is gradually and smoothly switched from the fuel pressure of the multi injection to the fuel pressure of the normal injection with change in the load. Thus, occurrence of a torque shock can be avoided. At the same time, since the data for fuel pressure control in the transition region is not needed any more, the number of meshes of the data map and the like can be also reduced in this point. With regard to the interpolation, various interpolation methods can be used, but if linear interpolation (interpolation by a linear expression) is used, the number of data required for the interpolation is small, calculation becomes easy, and control is simplified.

Also, the exhaust gas purification system for achieving the above object is, in a control method of an exhaust gas purification system including an exhaust gas purification device having an oxidation catalyst device carrying an oxidation catalyst on the upstream side or an exhaust gas purification device carrying an oxidation catalyst and a controller for carrying out forced regeneration control for recovering purification capability of the exhaust gas purification device in an exhaust passage of an internal combustion engine, in which at forced regeneration control, the controller executes the multi injection control in order to raise an exhaust temperature, configured such that at the forced regeneration control, the controller executes the normal injection control by stopping the multi injection when the operation state of the internal combustion engine is a high-load operation state and according to a rotation speed and a load of the internal combustion engine, a region for control is divided into a multi-injection region, and in the transition region, using data for fuel pressure control obtained by interpolation of the data for fuel pressure control of the multi injection control on the multi injection control region side and data for fuel pressure control of the normal injection control on the normal injection control region side, in-cylinder fuel injection is carried out.

Moreover, in the above exhaust gas purification system, the controller is configured to perform the interpolation in the transition region such that based on a load Qm at a rotation speed Nem of the internal combustion engine, supposing that a load and data for fuel pressure control at a boundary on the multi-injection control region side at the rotation speed Nem are Qml and Pml, and that a load and data for fuel pressure control at a boundary on the normal injection control region side at the rotation speed Nem are Qnl and Pnl, the data Pt for fuel pressure control calculated by Pt=((Qnl−Qt)×Pml+(Qt−Qml)×Pnl)/(Qnl−Qml) is set as the data P for fuel pressure control in the transition region.

Also, in the above exhaust gas purification system, the controller is configured such that a total fuel injection amount injected during one cycle of each cylinder is used instead of the load.

According to the exhaust gas purification system with the above configuration, the above exhaust gas purification method can be put into practice and the similar effect can be obtained. Also, the exhaust gas purification device includes not only the continuous regeneration type DPF device but also an NOx purification device such as a NOx occlusion and reduction type catalyst or NOx direct reduction type catalyst and the like carrying out the similar forced regeneration control. Moreover, the application range of the present invention can also include the forced regeneration control and the like such as recovery from sulfur poisoning, forced regeneration control to the sulfur poisoning and the like of an exhaust gas purification device provided with not only the NOx occlusion and reduction type catalyst or NOx direct reduction type catalyst but also a selective reduction type (SCR) catalyst and the like. I Essential, any exhaust gas purification system carrying out the control similar to the Above is within the application range of the present invention.

Advantages Of The Invention

According to the control method of exhaust gas purification system and the exhaust gas purification system according to the present invention, since in the forced regeneration control of the exhaust gas purification device such as a continuous regeneration type DPF device, an NOx purification device and the like, data for control of normal operation control can be used in a portion for the normal injection control region corresponding to the high-load operation state, data for control for the forced regeneration control is reduced.

Also, in the forced regeneration control, even at transition between the multi-injection control region in which the operation state of the internal combustion engine requires multi injection and the normal injection control region not requiring the multi injection, a transition region is provided so that the fuel pressure of the in-cylinder fuel injection can be smoothly changed, and occurrence of torque shock can be prevented. Moreover, since the interpolation is used in this transition region, data for fuel pressure control in the transition region is not needed, either. Therefore, the number of meshes of the data map of the data for the fuel pressure control in the forced regeneration control and the like can be reduced.

EXPLANATION OF REFERENCE NUMERALS

1: exhaust gas purification system
10: diesel engine (internal combustion engine)
12: continuous regeneration type DPF device
12a: oxidation catalyst
12b: filter with catalyst
31: differential pressure sensor
40: controller (ECU)
P: data for fuel pressure control
Pm: data for fuel pressure control for multi injection
Pml: data for fuel pressure control at boundary on the multi-injection control region side
Pn: data for fuel pressure control for normal injection
Pnl: data for fuel pressure control at boundary on the normal injection region side
Pt: data for fuel pressure control for interpolation (data for fuel pressure control in transition region)
Lm: boundary on the multi-injection control region side
Ln: boundary on the normal injection region side
Ne, Nem: engine rotation speed
Q, Qm: engine load
Qml: load at boundary on the multi-injection control region side
Qnl: load at boundary on the normal injection region side
Rm: multi injection control region
Rn: normal injection control region
Rt: transition region
t: index value of position

DETAILED DESCRIPTION OF THE INVENTION

Figure 1:
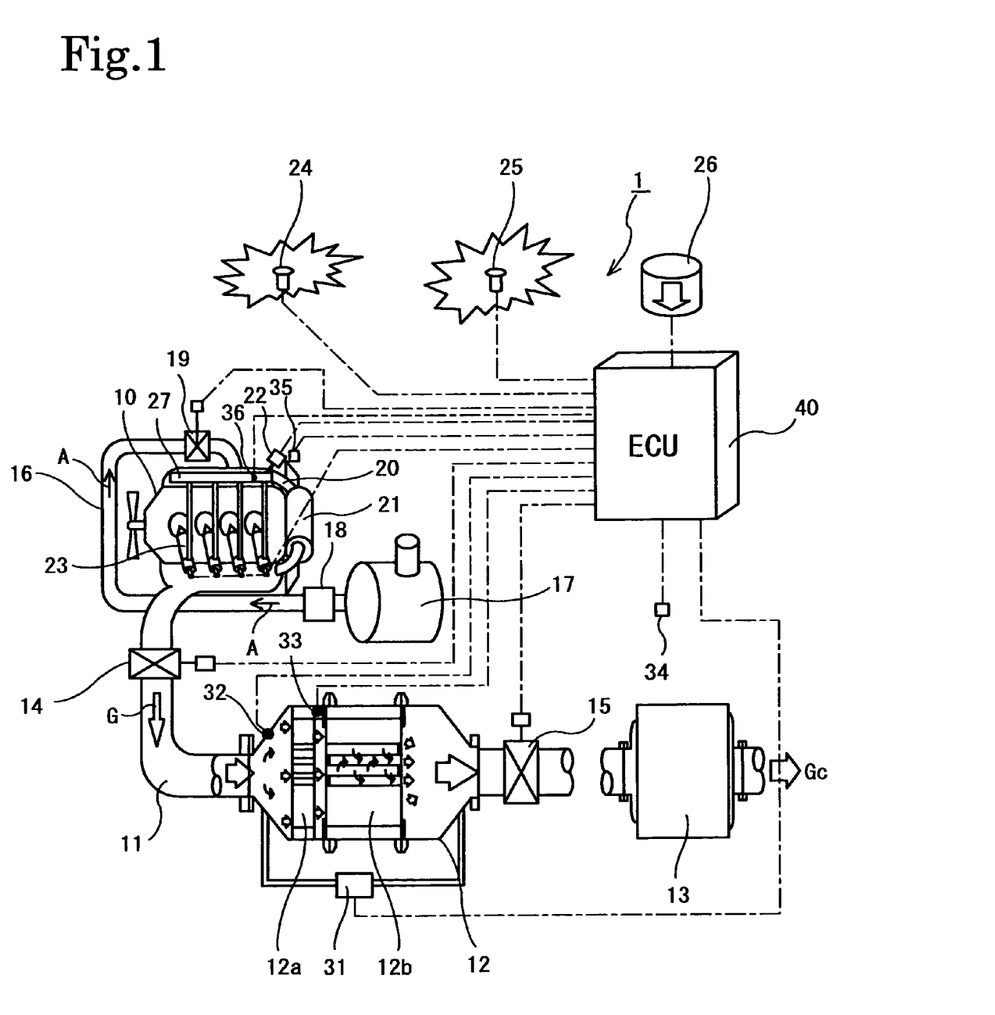
FIG. 1 is a diagram illustrating an entire configuration of an exhaust gas purification system.

The control method of exhaust gas purification system and an exhaust gas purification system of an embodiment according to the present invention will be described below referring to the attached drawings using a continuous regeneration type DPF (Diesel Particulate Filter) device as an example. FIG. 1 shows configuration of an exhaust gas purification system 1 of this embodiment.

The exhaust gas purification system 1 comprises an exhaust gas purification device 12 in an exhaust passage 11 of a diesel engine (internal combustion engine) 10. This exhaust gas purification device 12 is one of continuous regeneration type DPF devices. The exhaust gas purification device 12 includes an oxidation catalyst device 12a on the upstream side and a filter device 12b with catalyst on the downstream side. Moreover, on the downstream side of the exhaust gas purification device 12, a silencer 13 is provided. Also, on the upstream side of the exhaust gas purification device 12, an exhaust brake valve (exhaust brake) 14 is provided, while on the downstream side, an exhaust throttle valve (exhaust throttle) 15 is provided.

The oxidation catalyst device 12a is formed by having an oxidation catalyst such as platinum (Pt) carried by a carrier such as a porous ceramic honeycomb structure. The filter device 12b with catalyst is formed by a monolith-honeycomb wall-flow type filter and the like in which an inlet and an outlet of a channel of a porous ceramic honeycomb are alternately sealed. A catalyst of platinum, cerium oxide and the like is carried in this filter portion. PM (particulate matter) in an exhaust gas G is trapped by a wall of the porous ceramic.

In order to estimate an accumulated amount of the PM in the filter device 12b with catalyst, a differential pressure sensor 31 is provided in a conduit connected to before and after the exhaust gas purification device 12. Also, for regeneration control of the filter device 12b with catalyst, an oxidation-catalyst inlet exhaust-temperature sensor 32 is provided on the upstream side of the oxidation catalyst device 12a and a filter inlet exhaust-temperature sensor 33 is provided between the oxidation catalyst device 12a and the filter device 12b with catalyst.

This oxidation-catalyst inlet exhaust-temperature sensor 32 detects a first exhaust gas temperature $Tg1$, which is a temperature of the exhaust gas flowing into the oxidation catalyst device 12a. The filter inlet exhaust-temperature sensor 33 detects a second exhaust gas temperature $Tg2$, which is a temperature of the exhaust gas flowing into the filter device 12b with catalyst.

Moreover, in an intake passage 16, an air cleaner 17, an MAF sensor (intake air amount sensor) 18, an intake throttle valve (intake throttle) 19 and the like are provided. The intake throttle valve 19 adjusts an amount of intake air A flowing into an intake manifold. At an EGR passage 20, an EGR cooler 21 and an EGR valve 22 are provided.

Output values of these sensors are inputted to a controller (ECU: Engine Control Unit) 40 for general control of operation of the engine 10 as well as regeneration control of the exhaust gas purification device 12. By control signals outputted from the controller 40, the intake throttle valve 19, a fuel injection device (injection nozzle) 23, the exhaust brake valve 14, the exhaust throttle valve 15, the EGR valve 22 and the like are controlled.

The fuel injection device 23 is connected to a common rail injection system 27 temporarily reserving high-pressure fuel whose pressure has been raised by a fuel pump (not shown). Into the controller 40, information such as a vehicle speed, cooling water temperature and the like in addition to information such as acceleration opening from an accelerator position sensor (APS) 34, engine rotation speed from an engine rotation speed sensor 35, a common rail pressure from a rail pressure sensor 36 and the like are inputted for operation of the engine. The controller 40 also outputs electrification time signals so that a predetermined amount of fuel is injected from the fuel injection device 23.

In the regeneration control of the exhaust gas purification device 12, not only for automatic forced regeneration during running but also for forced regeneration arbitrarily performed by a driver after stopping the vehicle, a flashing lamp (DPF lamp) 24 and an alarm lamp 25 as alarming means for promoting awareness of the driver and a manual regeneration button (manual regeneration switch) 26 are provided. The alarming means draws attention of a driver when a trapped amount of the PM in the filter device 12b with catalyst exceeds a given amount and the filter device 12b with catalyst is clogged.

Next, control of the exhaust gas purification system 1 will be described. In this control, PM is trapped in normal operation. In this normal operation, whether it is timing to start the forced regeneration or not is monitored, and if it is determined that it is time to start the forced regeneration, the forced regeneration control is executed. This forced regeneration control includes running automatic regeneration for carrying out forced regeneration control during running and manual regeneration started by pressing the manual regeneration button 26 after stopping of a vehicle by a driver upon an alarm. These are selected and executed as appropriate according to a traveling distance and a value of DPF differential pressure. A regeneration controller for carrying out these forced regeneration controls is incorporated in the controller 40.

And regarding the forced regeneration such as the manual regeneration and running automatic regeneration in this embodiment, a first exhaust gas temperature rise control is executed when a catalyst temperature index temperature indicating a temperature of the oxidation catalyst 12a (bed temperature) is lower than a predetermined first determining temperature Tc1, while a second exhaust gas temperature rise control involving post injection is executed when the temperature is at the predetermined first determining temperature Tc1 or above. Moreover, temperature maintaining control is executed when a filter temperature index temperature indicating a temperature of the filter device 12b with catalyst is at a predetermined second determining temperature Tc2 or above.

Figure 2:
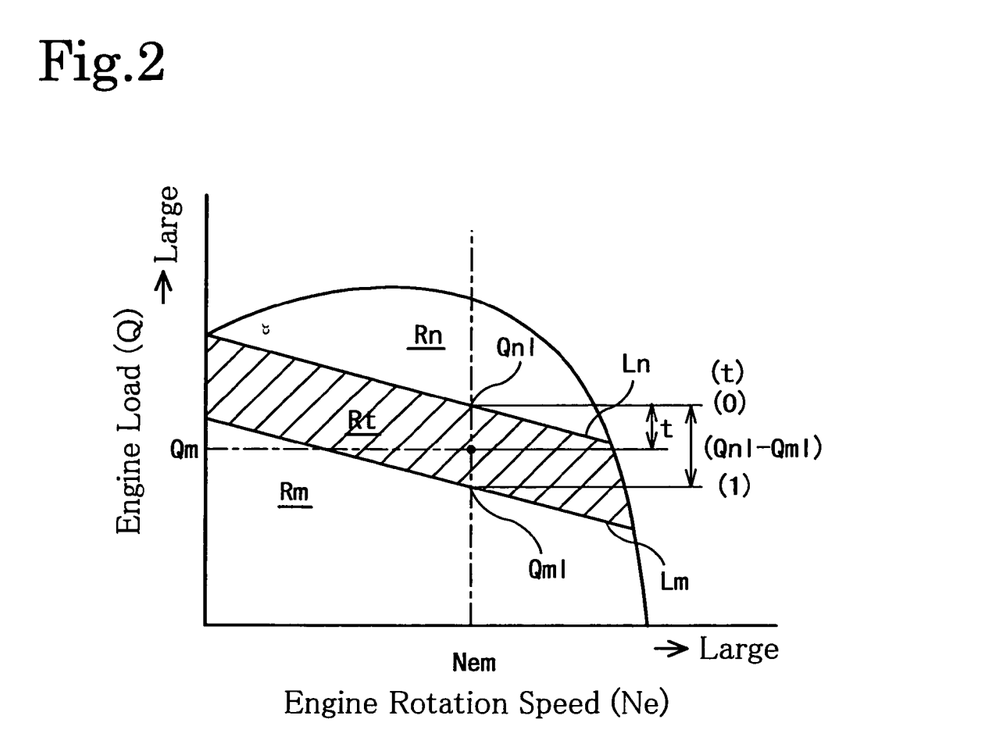
FIG. 2 is a diagram schematically illustrating an example of a region data map.

In the present invention, in any of the first exhaust gas temperature control, second exhaust gas temperature control, and temperature maintaining control, as shown in FIG. 2, multi-injection control for exhaust gas temperature rise is executed in a multi-injection control region Rm corresponding to a low-/medium-load operation region, while normal injection control without the multi-injection control is executed in a normal injection control region Rn corresponding to a high-load operation state. Also, in a transition region Rt provided between the multi-injection control region Rm and the normal injection control region Rn, the multi-injection control by data for fuel pressure control acquired by interpolation is executed.

This interpolation is executed as follows. First, a region data map divided into the multi-injection control region Rm, the transition region Rt, and the normal injection control region Rn with respect to a rotation speed Ne (lateral axis) and a load Q (vertical axis) of an internal combustion engine, as shown in FIG. 2, is prepared and stored in the controller 40. This region data map can be set in advance by examining if the exhaust gas temperature should be raised by multi injection or not by experiments or calculations.

Next, from the engine rotation speed Nem and the load (or total fuel injection amount) Qm indicating the engine operation state detected during the forced regeneration control, it is determined in which region of the region data map shown in FIG. 2 a current engine operation state (at control) is located. That is, when a load at a boundary Lm on the multi-injection control region (low-/medium-load operation state) Rm side at the rotation speed Nem is Qml and a load at a boundary Ln on the normal injection region (high-load operation state) Rn side is Qnl, if the load Qm is not more than the load Qml, it is considered to be in the multi-injection control region Rm, if the load Qm exceeds the load Qml and not more than the load Qnl, it is considered to be in the transition region Rt, and if the load Qm exceeds the load Qnl, it is considered to be in the normal injection control region Rn.

If in the multi-injection control region Rm, the multi-injection control is executed based on data Pm for fuel pressure control calculated from the data map for control of the multi injection, while if in the normal injection control region Rn, the normal injection control is executed based on data Pn for fuel pressure control calculated from the data map for fuel pressure control for the normal injection. The fuel pressures Pm, Pn are 80 to 180 MPa, for example, at the normal injection, and is lower at multi injection than at the normal injection and is different according to the rotation speed. A drop amount of the fuel pressure might reach approximately several tens % of the fuel pressure at the normal injection.

On the other hand, if in the transition region Rt, in-cylinder fuel injection is executed using data P for fuel pressure control obtained by interpolation of the data Pml for fuel pressure control of the multi injection at the boundary Lm on the multi-injection control region Rm side at the rotation speed Nem of the engine 10 and the data Pnl for fuel pressure control of the normal injection at the boundary Ln on the normal injection region Rn side at the rotation speed Nem of the engine 10. The data Pml for fuel pressure control of the multi injection is obtained from the fuel pressure (target rail pressure) base map for the multi injection control, and the data Pnl for the fuel pressure control of normal injection is obtained from the fuel pressure (target rail pressure) base map for the normal injection control.

If linear interpolation is used as the interpolation, an amount of data for fuel pressure control Pt calculated by $Pt = ((Qnl-Qm) \times Pml + (Qm-Qml) \times Pnl)/(Qnl-Qml)$ is set as the data P for fuel pressure control in the transition region Rt.

Also, in this interpolation, first, an index value t of a position in the transition region Rt is calculated and interpolation may be executed using that. The index value t of the position indicates a position corresponding to the load Qm by a numeral value from 0 (zero) to 1 when the position of the boundary Ln on the normal injection region Rn side is 0 (zero) and the position of the boundary Lm on the multi injection region Rm side is 1, and it is calculated by $t = (Qnl-Qm)/(Qnl-Qml)$. Next, using this t, the amount Pt of the data for fuel pressure control calculated by $Pt = t \times Pml + (1-t) \times Pnl$ is made the data P for fuel pressure control in the transition region Rt.

Also, usually, as the region data map as shown in FIG. 2, different data map is used for the first exhaust gas temperature control, second exhaust gas temperature control, and temperature maintaining control, respectively. However, for further simplification of control, the map data of the same region may be used in order to reduce the number of data maps for control.

Figure 3:
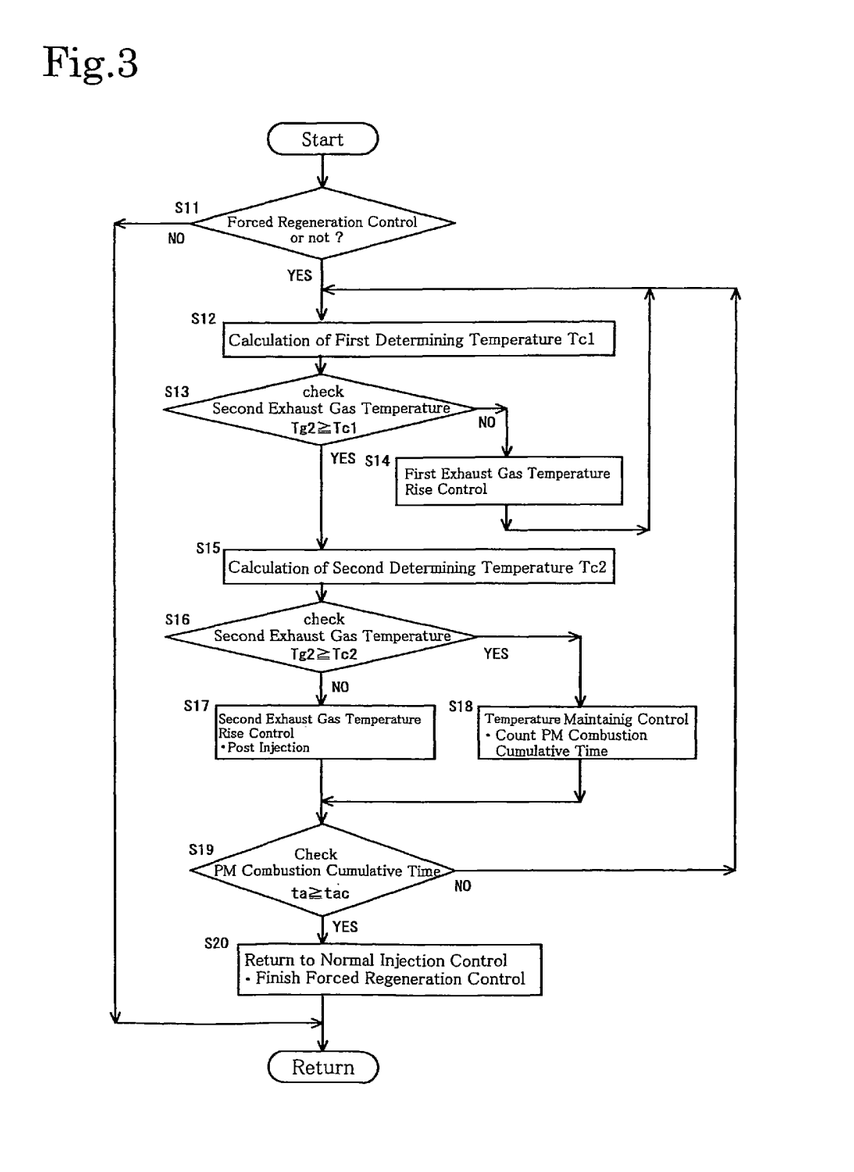
FIG. 3 is a diagram illustrating an example of a control flow of forced regeneration control.

Next, the control will be described using control flows in FIGS. 3 to 5. When the control flow in FIG. 3 is started, at Step S11, it is determined if control is the forced regeneration control by the running automatic regeneration or manual regeneration or not. If the control is not the forced regeneration control, the forced regeneration control is not executed but the routine is returned and the normal operation control is executed. If it is determined as the forced regeneration control at Step S11, the routine goes to Step S12.

Whether the control is forced regeneration control or not is determined as follows. In the case of the forced regeneration control by manual regeneration, when a differential pressure detected by the differential pressure sensor 31 for measuring a differential pressure between before and after the exhaust gas purification device 12 exceeds a predetermined differential pressure value for determination or the like, the flashing lamp (DPF lamp) 23 as alarming means is flashed and the driver is prompted for manual regeneration of the DPF. When the driver prompted for the manual regeneration stops the vehicle and operates the manual regeneration button 25, the control becomes the forced regeneration control. In the case of the forced regeneration control in the running automatic regeneration, when it is detected from a detection value of the differential pressure sensor 31 and the like that a trapped amount of PM in the filter device 12b with catalyst exceeds a given amount, the control becomes the forced regeneration control.

At Step S12, the first determining temperature Tc1 is calculated. This first determining temperature Tc1 is a temperature (approximately 200 to 250° C., for example) at which HC, which is an unburned fuel supplied by the post injection, is sufficiently oxidized by the oxidation catalyst of the oxidation catalyst device 12a if the second exhaust gas temperature (catalyst temperature index temperature) Tg2, which is the exhaust gas temperature detected by the filter inlet exhaust-temperature sensor 33, becomes this temperature. A value changed according to the engine rotation speed Nem at that time may be used. Also, instead of the second exhaust gas temperature Tg2 detected by the filter inlet exhaust-temperature sensor 33, the first exhaust gas temperature Tg1 detected by the oxidation-catalyst inlet temperature-sensor 32 may be used.

At the subsequent Step S13, the second exhaust gas temperature (catalyst temperature index temperature) Tg2 is checked. If the second exhaust gas temperature Tg2 is lower than the first determining temperature Tc1 calculated at Step S12, the first exhaust gas temperature rise control is carried out at Step S14 for a predetermined time (time relating to an interval of check of the second exhaust gas temperature Tg2 at Step S13) Δt1. After Step S13, the routine returns to Step S12.

If it is determined at Step S13 that the second exhaust gas temperature Tg2 is at the predetermined first determining temperature Tc1 or above, the routine goes to Step S15. At Step S15, the second determining temperature Tc2 is calculated. The second determining temperature Tc2 is a target temperature for the second exhaust gas temperature rise control at Step S17, and by maintaining the second exhaust gas temperature (filter temperature index temperature) Tg2, which is an exhaust gas temperature detected by the filter inlet exhaust-temperature sensor 33, at the temperature Tc2 or above, combustion of the PM trapped in the filter device 12b with catalyst is maintained in a favorable state. The second exhaust gas temperature Tg2 is a temperature of an exhaust gas detected by the filter inlet exhaust-temperature sensor 33. The second determining temperature Tc2 is usually set at a value higher than a combustion start temperature of the PM (approximately 350° C., for example), at approximately 500° C., for example. The value of the second determining temperature Tc2 may be changed in multi-stages according to time.

At the subsequent Step S16, the second exhaust gas temperature (filter temperature index temperature) Tg2 is checked. If the second exhaust gas temperature Tg2 is lower than the second determining temperature Tc2, the routine goes to the second exhaust gas temperature rise control at Step S17, while if the second exhaust gas temperature Tg2 is at the second determining temperature Tc2 or above, the routine goes to the temperature maintaining control at Step S18.

At Step S17, the second exhaust gas temperature rise control is conducted for a predetermined time (time relating to an interval of check of the second exhaust gas temperature Tg2 at Step S16) Δt2.

The exhaust gas temperature rise is continued by the second exhaust gas temperature rise control and at the same time, unburned fuel (HC) is supplied into the exhaust gas by the post injection. This unburned fuel is oxidized by the oxidation catalyst device 12a, and the exhaust gas temperature can be further raised by this oxidation heat. If the raised exhaust gas temperature Tg2 becomes at the second determining temperature Tc2 or above, the PM trapped by the filter device 12b with catalyst is burned. The second exhaust gas temperature Tg2 may be continuously raised to the temperature Tc2 as a control target by this second exhaust gas temperature rise control, but the temperature may be raised in two stages or multi-stages. After Step S17, the routine goes to Step S19.

If it is determined at Step S16 that the second exhaust gas temperature Tg2 is at the second determining temperature Tc2 or above, the temperature maintaining control without post injection in the in-cylinder injection of the engine 10 is conducted for a predetermined time (time relating to an interval of duration time check of the second exhaust gas temperature Tg2 at Step S16) Δt3 at Step S18.

Also, at Step S18, PM combustion cumulative time is counted. In this count, only if the second exhaust gas temperature Tg2 is at the predetermined second determining temperature Tc2 or above, the PM combustion cumulative time ta is counted (ta=ta+Δt3). After Step S18, the routine goes to Step S19.

At Step S19, in order to determine if the regeneration control is to be finished or not, the PM combustion cumulative time ta is checked. In this check, it is checked if the PM combustion cumulative time ta exceeds a predetermined determining time Tac or not. That is, if it exceeds, the regeneration control is considered to be completed, and the routine goes to Step S20, while if it does not exceed, the regeneration control is considered not to be completed, and the routine returns to Step S12. Till the PM combustion cumulative time ta exceeds the predetermined determining time tac, the first exhaust gas temperature rise control at Step S14, the second exhaust gas temperature rise control at Step S17 or the temperature maintaining control at Step S18 is carried out.

At Step S20, the forced regeneration control is finished, and if the vehicle is parked, the exhaust brake valve 13 and the exhaust throttle valve 14 are returned to the normal operation state and the routine returns to the normal injection control. And then, it returns.

In the control flow in FIG. 3, if the catalyst temperature index temperature Tg2 indicating the oxidation catalyst temperature (bed temperature) is lower than the predetermined first determining temperature Tc1, the first exhaust gas temperature rise control is executed, while if the temperature becomes at the predetermined first determining temperature Tc1 or above, the second exhaust gas temperature rise control with post injection is carried out. Moreover, if the filter temperature index temperature indicating the temperature of the filter device 12b with catalyst becomes the predetermined second determining temperature Tc2 or above, the temperature maintaining control is executed.

In the control flow in FIG. 3, as the catalyst temperature index temperature indicating the temperature of the oxidation catalyst 12a (bed temperature), the second exhaust gas temperature Tg2 detected by the filter inlet exhaust-temperature sensor 33 is used, and as the filter temperature index temperature indicating the temperature of the filter device 12b with catalyst, too, the second exhaust gas temperature Tg2 detected by the filter inlet exhaust-temperature sensor 33 is used. However, as the catalyst temperature index temperature indicating the temperature of the oxidation catalyst 12a (bed temperature), the first exhaust gas temperature Tg1 detected by the oxidation-catalyst inlet exhaust-temperature sensor 32 may be used.

And in the present invention, in the first exhaust gas temperature rise control at Step S14, the second exhaust gas temperature rise control at Step S17, and the temperature maintaining control at Step S18, the multi-injection control is executed in the low-/medium-load operation region but in the high-load operation state, the normal injection control without multi injection is carried out.

Figure 4:
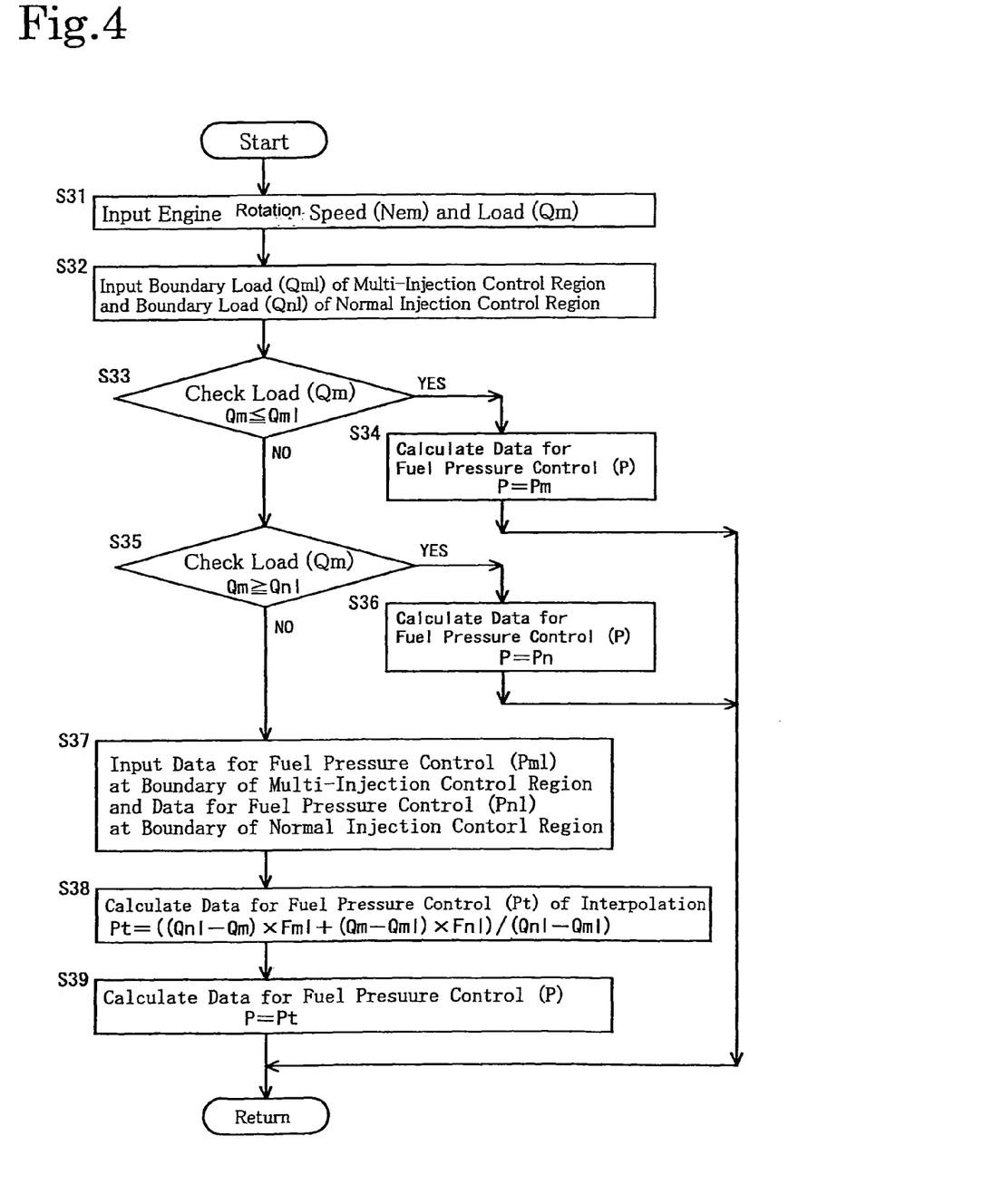
FIG. 4 is a diagram illustrating an example of a control flow for calculating data for fuel pressure control.
Figure 5:
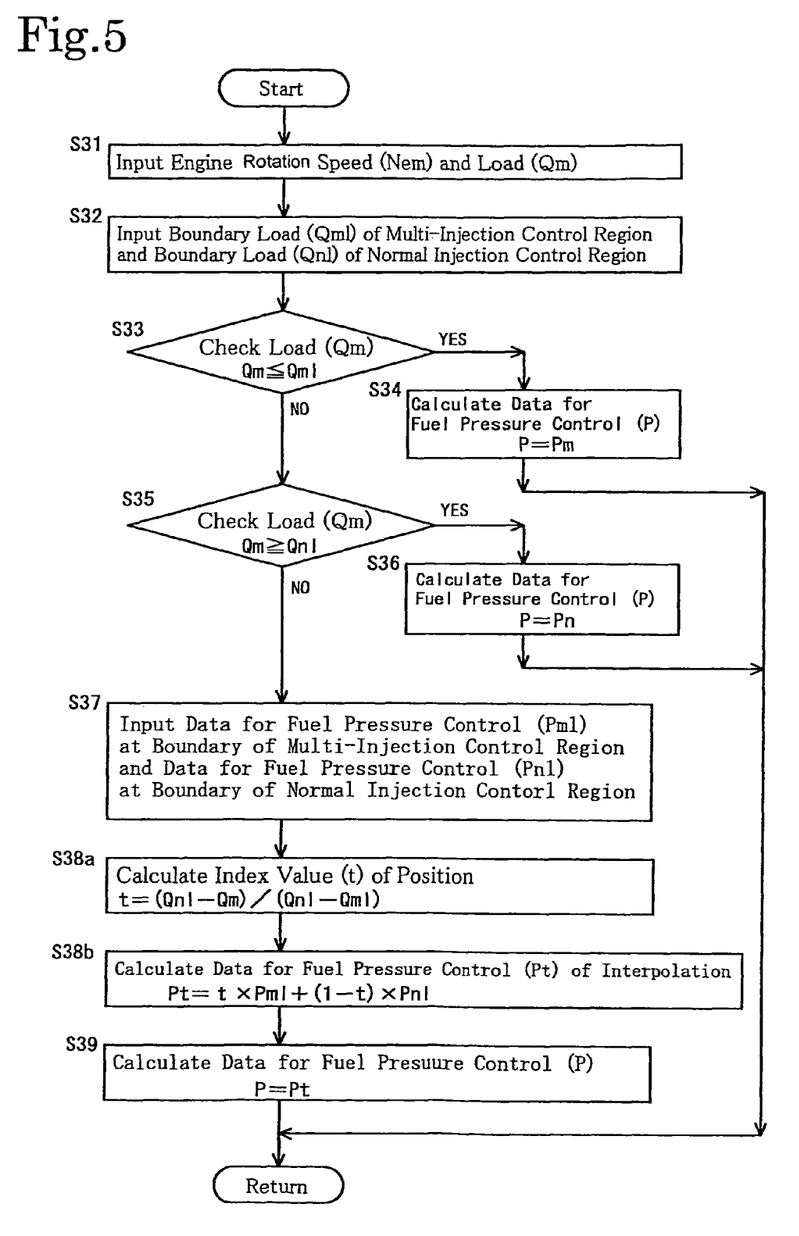
FIG. 5 is a diagram illustrating another example of a control flow for calculating data for fuel pressure control.

This control can be conducted according to the control flow as shown in FIGS. 4 and 5. The control flow in FIGS. 4 and 5 is called when the data P for fuel pressure control of the in-cylinder fuel injection is required when the first exhaust gas temperature rise control, second exhaust gas temperature rise control, temperature maintaining control is started, and the data P for fuel pressure control is calculated by this control flow and the routine returns to a location where the control flow is called after the calculation.

When the control flow in FIG. 4 is started, the engine rotation speed Nem and the load Qm indicating the operation state of the engine 10 are inputted at Step S31. At Step S32, the load Qml at the boundary Lm on the multi-injection control region Rm side at the rotation speed Nem of the engine 10 and the load Qnl at the boundary Ln on the normal injection region Rn side are inputted.

At the subsequent Step S33, the load Qm is checked and it is determined if the load is not more than the load Qml or not. If the load Qm is not more than the load Qml in this determination, the routine goes to Step S34, where the data P for fuel pressure control is made the data Pm for fuel pressure control calculated from the fuel pressure data map of the multi injection and the routine returns.

If the load Qm is not the load Qml or less in the determination at Step S33, the routine goes to Step S35, where the load Qm is checked and it is determined if the load is not less than the load Qnl or not. If the load Qm is not less than the load Qnl in this determination, the routine goes to Step S36, where data P for fuel pressure control is made the data Pn for fuel pressure control calculated from the fuel pressure data map of the normal injection of normal operation and the routine returns.

If the load Qm is not the load Qnl or more in the determination at Step S35, the routine goes to Step S37. At Step S37, the data Pml for fuel pressure control of the multi injection at the boundary Lm on the multi-injection control region Rm side at the rotation speed Nem of the engine 10 and the data Pnl for fuel pressure control of the normal injection at the boundary Ln on the normal injection region Rn side at the rotation speed Nem of the engine 10 are inputted.

At the subsequent Step S38, the data Pt for injection control of the interpolation is calculated by $Pt=((Qnl-Qm) \times Pml+(Qm-Qml) \times Pnl)/(Qnl-Qml)$, and at the subsequent Step S39, the data P is made Pt and the routine returns.

Here, in this interpolation, if the index value t of the position in the transition region Rt is used, as shown in the control flow in FIG. 5, it is constituted by Step S38a and Step S38b instead of Step S38. At Step S38a, the index value t of the position is calculated by $t=(Qnl-Qm)/(Qnl-Qml)$. At Step S38b, using the index value t of the position, the data Pt for fuel pressure control is calculated by $Pt=t \times Pml+(1-t) \times Pnl$.

According to the control flow in FIGS. 4 and 5, in the forced regeneration control, if the operation state of the engine 10 is a high-load operation state, the normal injection control by stopping the multi injection is carried out and at the same time according to the rotation speed Nem and the load Qm of the engine 10, the region for control is divided into the multi-injection control region Rm, the transition region Rt, and the normal injection control region Rn. In the transition region Rt, using the data Pt for fuel pressure control obtained by interpolation of the data Pml for fuel pressure control of the multi-injection control at the boundary Lm on the multi-injection control region Rm side and the data Pnl for fuel pressure control of the normal injection control at the boundary Ln on the normal injection control region Rn side, the in-cylinder fuel injection can be carried out.

Also, at the interpolation in the transition region Rt, based on the load Qm at the rotation speed Nem of the engine 10, the load and the data for fuel pressure control at the boundary Lm on the multi-injection control region Rm side at the rotation speed Nem are set as Qml and Pml, and the load and the data for fuel pressure control at the boundary Ln on the normal injection control region Rn side at the rotation speed Nem are set as Qnl and Pnl, the data Pt for fuel pressure control calculated by $Pt=((Qnl-Qt) \times Pml+(Qm-Qml) \times Pnl))/(Qnl-Qml)$ can be made the data P for fuel pressure control in the transition region Rt.

In the above embodiment, as the exhaust gas purification device of the exhaust gas purification system, combination of the oxidation catalyst device 12a on the upstream side and the filter 12b with catalyst on the downstream side was used as an example in the explanation. However, the exhaust gas purification device may be a filter carrying an oxidation catalyst. Moreover, as the method of supplying the unburned fuel (HC) to the upstream side of the oxidation catalyst 12a, post injection was explained. However, by arranging an unburned fuel supply device in the exhaust passage 16, a method of direct injection into an exhaust pipe that directly injects unburned fuel into the exhaust passage 16 from the unburned fuel supply device may be employed.

Also, as the exhaust gas purification device, not only the continuous Regeneration type DPF but also an NOx purification device such as an NOx occlusion and reduction type catalyst or an NOx direct reduction type catalyst and the like carrying out the similar forced regeneration control may be employed. Moreover, the application range of the present invention may include the forced regeneration control and the like from recovery from sulfur poisoning and the like. Therefore, the forced regeneration control and the like to the sulfur poisoning of the exhaust gas purification device provided with not only the NOx occlusion and reduction type catalyst or the NOx direct reduction type catalyst but also the selective reduction type (SCR) catalyst and the like may be included.

The control method of the exhaust gas purification system and the exhaust gas purification system of the present invention having the above-mentioned excellent effects can be utilized extremely effectively for a control method of an exhaust gas purification system provided with an exhaust gas purification device having an oxidation catalyst device carrying an oxidation catalyst on the upstream side or an exhaust gas purification device carrying an oxidation catalyst in an exhaust passage of an internal combustion engine mounted on an automobile and the like and a controller carrying out forced regeneration control for recovering a purification capability of the exhaust gas purification device, in which the controller executes multi injection control for raising an exhaust temperature at the forced regeneration control.

What is claimed is:

1. An exhaust gas purification system, comprising:
an exhaust gas purification device having an oxidation catalyst on an upstream side of the exhaust gas purification device in an exhaust passage of an internal combustion engine;
a controller programmed to carry out, during a forced regeneration control for recovering purification capability of the exhaust gas purification device, a normal injection control without a multi-injection, a multi-injection control for raising a temperature of exhaust gas exhausted from the engine by executing a multi-injection in the engine, and a post injection control supplying unburned fuel into the exhaust gas by executing a post injection in the engine; and
a sensor to detect a temperature of the oxidation catalyst, wherein the controller is programmed to execute a first exhaust gas temperature rise control without post injection, a second exhaust gas temperature rise control with post injection, and a temperature maintaining control without post injection, separately according to the detected temperature of the oxidation catalyst, and
wherein the controller is programmed to determine from a rotation speed and a load of the engine whether the engine is in a high-load operation state in which a temperature of the exhaust gas exhausted from the engine is higher than a predetermined temperature when the controller is executing the first exhaust gas temperature rise control, the second exhaust gas temperature rise control, and the temperature maintaining control according to the detected temperature of the oxidation catalyst, and, when it is determined that the engine is in the high-load operation state, the controller executes the normal injection control without the multi-injection, during execution of the second exhaust gas temperature rise control.

2. The system according to claim 1, wherein
according to the rotation speed and the load of the engine, a region for control at the forced regeneration control is divided into a multi-injection control region for executing the multi-injection control, the transition region, and a normal injection control region for executing the normal injection control predetermined in response to the high-load operation state, and in the transition region, using data of fuel pressure control, calculated by interpolation of data of fuel pressure control of the multi injection control on the multi injection control region side and data of fuel pressure control of the normal injection control on the normal injection control region side, in in-cylinder fuel injection.

3. The system according to claim 2, wherein
said controller interpolates for the transition region such that, based on a load Qm at a rotation speed Nem of the engine, wherein a load and data for fuel pressure control at a boundary on the multi-injection control region side at the rotation speed Nem are Qml and Pml, and wherein a load and data for fuel pressure control at a boundary on the normal injection control region side at the rotation speed Nem are Qnl and Pnl, data Pt for fuel pressure control calculated by Pt =((Qnl −the Qm)×Pml +(the Qm −Qml)×Pnl) / (Qnl −Qml) is set as data P for fuel pressure control in the transition region.

4. A method for exhaust gas purification, comprising:
providing an exhaust gas purification device having an oxidation catalyst upstream of the exhaust gas purification device in an exhaust passage of an internal combustion engine;
carrying out, during a forced regeneration control for recovering purification capability of the exhaust gas purification device, a normal injection control without a multi-injection, a multi- injection control for raising a temperature of exhaust gas exhausted from the engine by executing a multi-injection in the engine, and a post injection control supplying unburned fuel into exhaust gas by executing a post injection in the engine;

detecting a temperature of the oxidation catalyst, executing a first exhaust gas temperature rise control without post injection, a second exhaust gas temperature rise control with post injection, and a temperature maintaining control without post injection, separately according to the detected temperature of the oxidation catalyst, and determining from a rotation speed and a load of the engine whether the engine is in a high-load operation state in which a temperature of the exhaust gas exhausted from the engine is higher than a predetermined temperature when executing the first exhaust gas temperature rise control, according to the detected temperature of the oxidation catalyst, and, when it is determined that the engine is in the high-load operation state, executing the normal injection control without the multi-injection, during execution of the second exhaust gas temperature rise control.

5. The method according to claim 4, further comprising:
dividing, according to the rotation speed and the load of the engine, a region for control, at the forced regeneration control, into a multi-injection control region for executing a normal injection control predetermined in response to the high-load operation state, and in the transition region, using data of fuel pressure control, calculated by interpolation of data of fuel pressure control of the multi injection control on the normal injection control region side, in in-cylinder fuel injection.

6. The method according to claim 5, further comprising:
executing an interpolation in said transition region based on a load Qm at a rotation speed Nem of the engine, wherein a load and data for fuel pressure control at boundary on the multi-injection control region side at the rotation speed Nem are Qml and Pml, and a load and data for fuel pressue control at a boundary on the normal injection control region side at the rotation speed Nem are Qnl, data Pt for fuel pressure control calculated by PT=((Qnl−the Qm)×Pml+(the Qm−Qml) ×Pnl)/Qnl−Qml) is set as data P for fuel pressure control in the transition region.

* * * * *